United States Patent

[11] 3,614,588

| [72] | Inventor | Alan Davies<br>Wantage, England |
|---|---|---|
| [21] | Appl. No. | 53,389 |
| [22] | Filed | July 9, 1970 |
| [45] | Patented | Oct. 19, 1971 |
| [73] | Assignee | United Kingdom Atomic Energy Authority<br>London, England |
| [32] | Priority | July 18, 1969 |
| [33] | | Great Britain |
| [31] | | 36418/69 |

[54] ELECTRIC HIGH VOLTAGE GENERATORS
8 Claims, 11 Drawing Figs.

[52] U.S. Cl. ................................................ 321/8 R,
                                                            321/15
[51] Int. Cl. .................................................. H02m 7/00
[50] Field of Search ....................................... 321/8, 15

[56] References Cited
UNITED STATES PATENTS
2,875,394  2/1959  Cleland ........................  321/15

| 3,063,000 | 11/1962 | Cleland | 321/15 |
| 3,246,230 | 4/1966 | Cleland | 321/15 |
| 3,303,406 | 2/1967 | Bedford | 321/44 |
| 3,406,328 | 10/1968 | Studtmann | 321/45 |
| 3,474,320 | 10/1969 | Chandler | 321/45 C |
| 3,533,010 | 10/1970 | Bowles | 321/15 |
| 3,539,903 | 11/1970 | Goebel | 321/15 X |

*Primary Examiner*—William M. Shoop, Jr.
*Attorney*—Larson, Taylor and Hinds

ABSTRACT: A high voltage generator of the Cockcroft-Walton type is constructed from modular units built up into a stack, the number of units determining the voltage. Each unit is contained within a screen with large radius outwardly facing surfaces. The units are ready stressed internally and the screens ease the stressing problems of building up a stack. A driving inverter of the switched thyristor type has inductance in the overflow diode path so that the inverter will withstand a short across the output and to improve the speed of thyristor recovery.

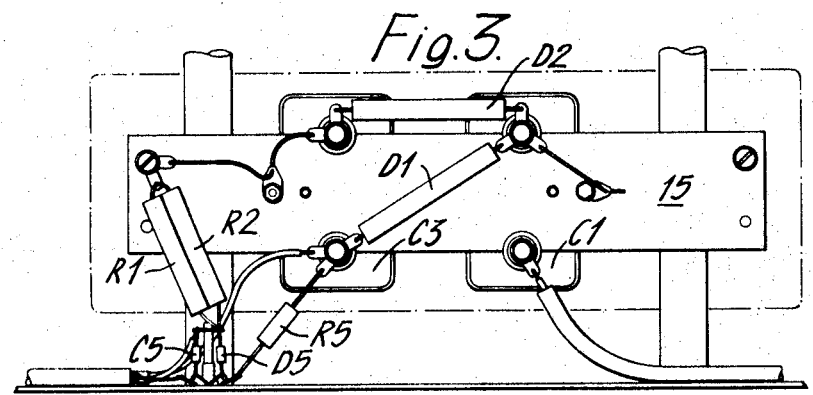
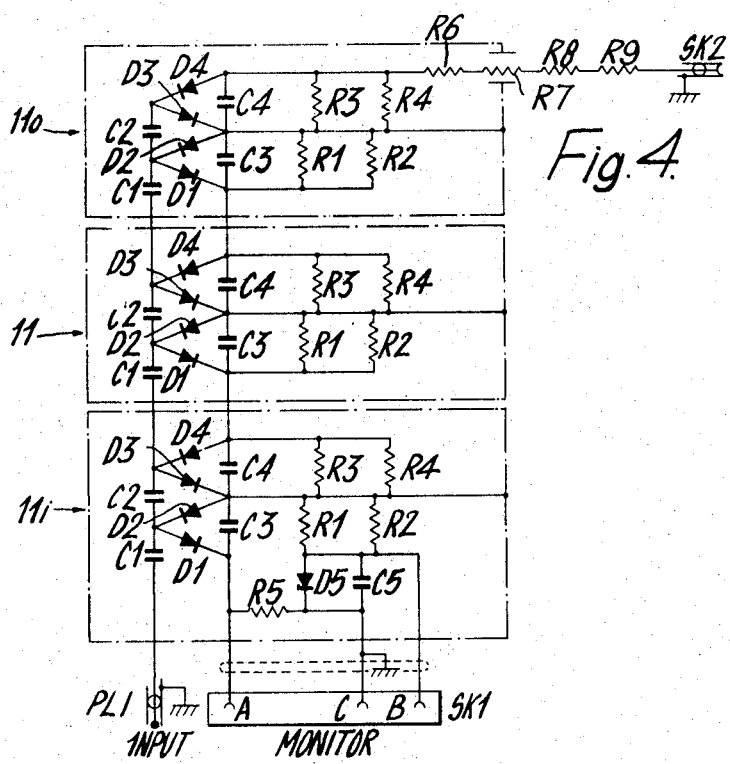

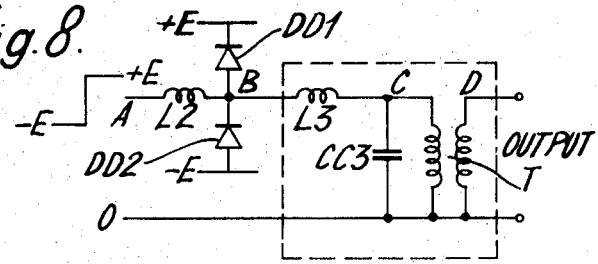
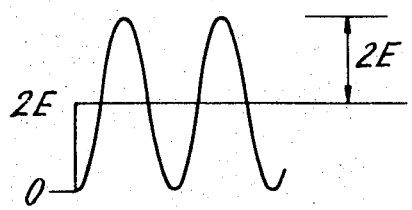
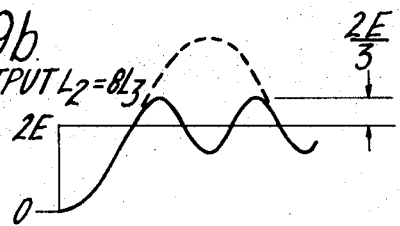
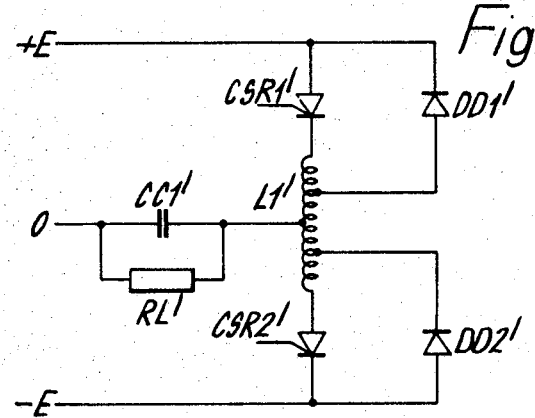

3,614,588

ELECTRIC HIGH VOLTAGE GENERATORS

BACKGROUND OF THE INVENTION

The invention relates to electric high voltage generators and more 5 to generators of the Cockcroft-Walton type.

A Cockcroft-Walton generator comprises two banks of series-connected capacitors with unidirectional zig-zag cross connection between the banks so that the application of an alternating current across the ends of the two banks causes successive charge transfer, with voltage addition, from the capacitor of one bank to the next capacitor of the other bank and so on.

SUMMARY OF THE INVENTION

The invention provides a C4—for a high voltage generator of the Cockcroft-Walton type, comprising one or more Cockcroft-Walton stages mounted within an electrically conducting casing, which forms an encompassing screen for the said stages, and input and output terminals adapted for ready connection, if desired, to another modular unit so that the voltage setup of each unit is added, whereby a stack of N interconnected modular units can generate a voltage NV, where V is the voltage generated by each modular unit on its own.

By Cockcroft-Walton stage is meant two capacitors with unidirectional path connection so that, with an alternating current input, charge is transferred with voltage addition from one capacitor to the other.

It is an important feature of the invention that the said screen is held at a potential intermediate, preferably midway, between, that of the input and output terminals of the modular unit.

With this arrangement, the said stages within each modular unit can be stressed for predetermined potential differences between its input and output terminals and between these terminals and the encompassing screen. Each modular unit with its encompassing screen can be stressed for a predetermined potential difference between it and an adjacent modular unit in a stack of modular units.

By stressing is meant the arrangement and design of the electrical components and terminations so as to avoid electrical breakdown, for example by sparking across an airgap between capacitor terminals.

A further important feature of the invention is that the edges of the encompassing screen are rolled over so that all outwardly facing surfaces of the screen are smoothly curved and of large enough radius for meeting the stressing requirement between adjacent screens of adjacent modular units when mounted in a stack. It will be appreciated that by encompassing each module with such a screen, the surfaces of which all have very small curvature compared with that of, for example, capacitor terminals, the stressing problems between one module and the next are greatly eased. Furthermore, this feature eases the stressing problem between that module of the stack at the highest voltage and nearby earthed objects, such as a main enclosure within which the stack is mounted.

The invention also provides a modular unit as aforesaid in combination with an inverter for supplying power to the unit, which inverter comprises two thyristors and means for switching the thyristors alternately on and off, the thyristors being connected for switching current from a source, or sources, of direct current to provide an alternating current to an output load, a resonant circuit connected to receive alternating current from the thyristors, which resonant circuit is connected and arranged to so resonate that current reversal in the resonant circuit causes cutoff of that thyristor which is on before the other thyristor is triggered on, two unidirectional overflow current paths connected respectively across the thyristors to bleed off reverse current from the resonant circuit after this has cutoff the "on" thyristor as aforesaid, each said unidirectional bleed current path including an inductor.

The two unidirectional bleed current paths may share a common inductor.

BRIEF DESCRIPTION OF THE DRAWINGS

Specific constructions of apparatus embodying the invention will now be described by way of example and with reference to the accompanying drawings in which:

FIG. 3 is a fragmentary view of part of the apparatus as seen in the direction of arrow B in FIG. 2, FIG. 4 is a circuit diagram of the electrical apparatus shown in FIGS. 1 to 3, FIG. 8 is an electrical circuit diagram of part of FIG. 5 showing the load circuit in more detail, FIGS. 9a and 9b show waveforms associated with the description of the operation of the circuit shown in FIG. 8, and FIG. 10 shows a modification of the inverter shown in FIG. 5.

DESCRIPTION OF PREFERRED EMBODIMENTS

In this example, a generator of high electrical voltage is provided by three modular units connected in a stack.

The basic modular unit 11, forming the central unit in this example, comprises four capacitors C1, C2, C3 and C4 connected with diodes D1, D2, D3, D4 in Cockcroft-Walton configuration as may be seen best from FIG. 4. Resistors R1, R2, R3 and R4, each of 100 megohms, are provided to allow the charge on the capacitors to leak away slowly so that a high voltage is not maintained across the apparatus while it is not switched on.

The lower unit 11$i$ and the upper unit 11$o$ are basically similar to the unit 11 but have slight modifications so that they may conveniently form respectively an input unit and an output unit.

The units 11$i$ and 11$o$ have the same array of capacitors C1, C2, C3, C4 and diodes D1, D2, D3, D4 and resistors R1, R2, R3, R4. However, the input unit 11$i$ is provided with a connection 12 to a socket PL1 to which input alternating current supply is connected. The input unit 11$i$ is also provided with a 220 ohm 3 watt resistor R5, and diode and capacitor D5 and C5 respectively for monitoring purposes. The resistor R5 is a shunt resistor arranged so that measurement of the voltage developed across the resistor R5 provides an indication of the output current. The arrangement of diode D5 and capacitor C5 provides for measuring the leakage current through the resistors R1 and R2, from which an indication of the voltage is derived.

The output unit 11$o$ has a cable connection 13 to an output socket SK2. Incorporated in this cable are a series of resistors R6, R7, R8, R9, each of 2.2 kilohms and 6 watts rating. The purpose of these resistors is to limit the current drawn from the output, in particular in the event that this should be shorted.

Figure 1:
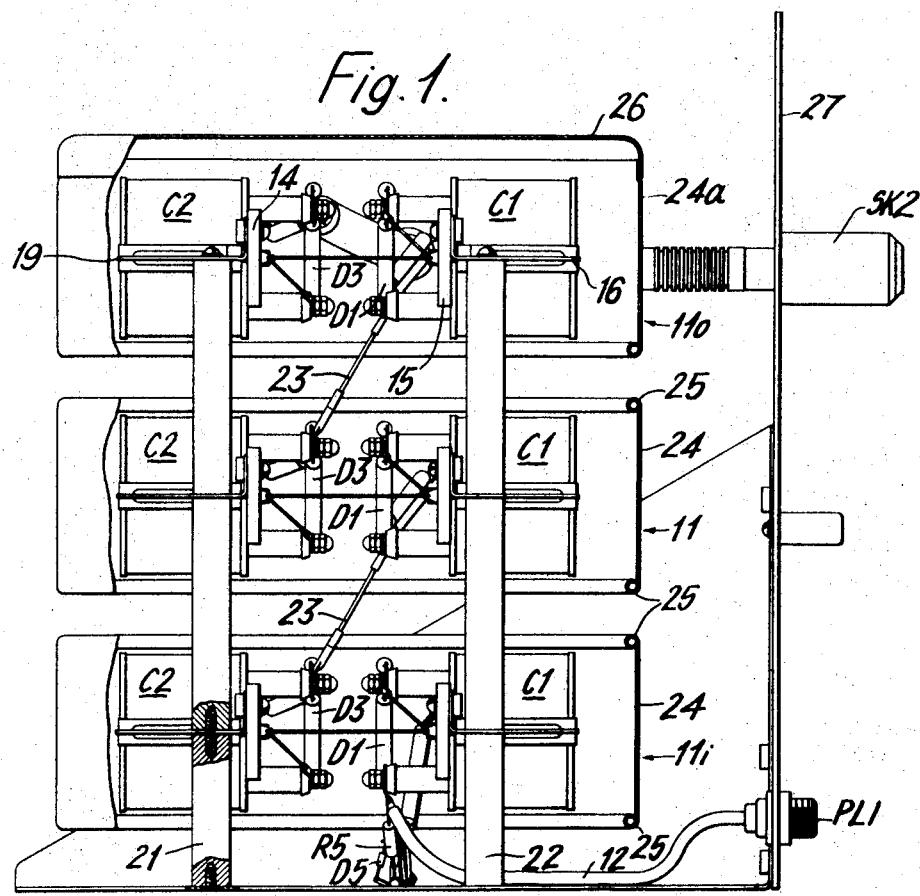
FIG. 1 is a side view partly sectioned in the direction of arrow A in FIG. 2.
Figure 2:
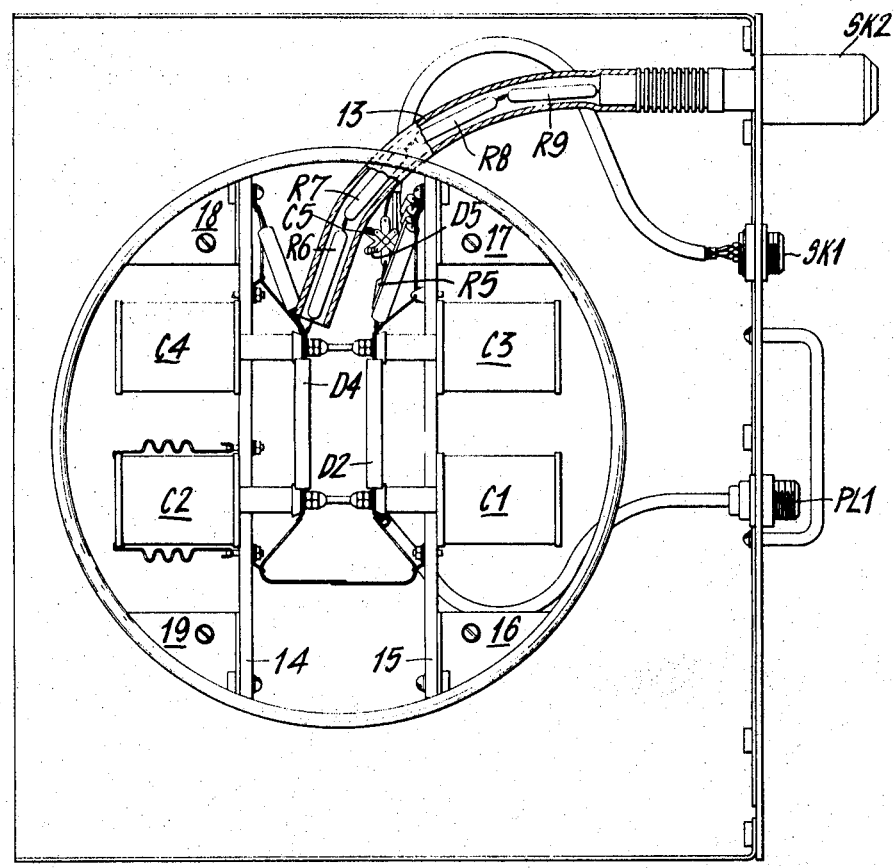
FIG. 2 is a plan view with some parts omitted.

FIGS. 1, 2 and 3 show the spacial disposition of the components. In each modular unit 11, or 11$o$ or 11$i$, the capacitors C1, C2, C3 and C4 are mounted in pairs on spaced plates 14, 15 provided with brackets 16, 17, 18, 19 adapted for attachment to perspex rod supports 21, 22.

Each modular unit has input and output terminals, of which only one of each can be seen in FIG. 1. In the stack, the appropriate input and output terminals are cross-connected by wire link connectors 23.

Each modular unit is encompassed by a cylindrical electrically conducting screen 24, the edges of which are rolled as at 25 to avoid the formation of high electric field stress.

The cylindrical screen 24$o$ for the output modular unit 11$o$ is shaped at the top to receive a smoothly-curved, tight-fitting lid 26 of electrically conducting material.

In this example, the modular units are each designed to produce 20 kilovolts. The components within the modular units are arranged to avoid electrical breakdown in air for a 20 kilovolts differential between input and output terminals. The screen 24 is held at a potential midway between the input and output terminals and is stressed for a 10 kilovolt differential in air between these terminals and the screen.

In the stack, the screens 24 are stressed for a 20 kilovolt differential between adjacent screens and the mounting within the main enclosure, such as indicated at 27, has to be such that no breakdown occurs between this and any of the screens 24, but particularly the screen 24o of the output modular unit as this will be at the highest potential relative to the earth support 27.

It will be appreciated that the stressing problems as between one modular unit and the next, or as between one of the modular units and the main supports, is greatly eased by the provision of the screens 24, the outwardly facing surfaces of which have very small curvature compared with, for example, the capacitor terminals.

A generator for a very high voltage may be constructed by adding modular units 11 into the stack between the input and output modular units. The stressing problems of such a construction are greatly reduced, since each modular unit is internally ready stressed and only stressing between one module and the next and with the surroundings has to be considered.

Component values, or specification, not already given, are as follow:

Resistors R1 and R2 in the input modular unit 11i marked * in FIG. 4 to have a combined resistance of 50 megohms ±2 percent.

Capacitors C1, C2, C3, C4—0.05 microfarads, 10 kilovolts working voltage,

Capacitor C5—100 picofarads.

Diodes D1, D2, D3, D4 for basic modular units 11 and output units 11o—LC 180.

Diodes D1, D2, D3, D4 for input modular units 11i—ED1 type RTD14.

Diode D5—2A 100F.

Monitor socket SK1=four-way Plessey Mk. IV socket.

FIG. 4 is drawn for a negative output stack. For positive output, all diodes have to be reversed.

Figure 5:
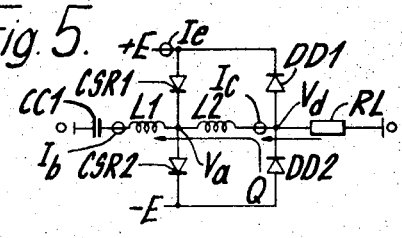
FIG. 5 is an electrical circuit diagram of part of an inverter.

FIG. 5 illustrates part of an inverter for supplying alternating current to the input at PL1 of the Cockcroft-Walton high voltage generator of FIGS. 1 to 4.

The output is taken, effectively from the point marked $Vd$, from across a load represented by resistor RL in FIG. 5 and shown in more detailed form within the dotted box in FIG. 8.

A direct current source provides voltages at +E, −E and 0 volts at the points marked appropriately in FIG. 5. Current is switched through resistor RL from +E and −E alternately by silicon-controlled rectifiers CSR1 and CSR2. Triggering pulses for these thyristors are supplied from an external circuit not shown. Commutation is secured by a resonant circuit comprising inductor L1 and capacitor CC1. Diodes DD1 and DD2 drain reverse current after their associated thyristor, respectively CSR1 and CSR2, has switched off.

Figure 6:
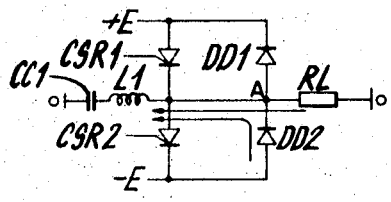
FIG. 6 is an electrical circuit diagram of the part of the inverter shown in FIG. 5, with a component omitted.

An inductor L2 performs an important function which may best be understood by considering the operation of the circuit in the absence of inductor L2, that is the circuit illustrated in FIG. 6.

Assuming the output from point A, FIG. 6, is a square wave, then just before switching on thyristor CSR1, the point A will be at −E volts and diode DD2 will be conducting as indicated by the arrow. When thyristor CSR1 is triggered, the potential at point A rises to +E volts, the current in the load resistor RL reverses and the current flowing through thyristor CSR1 into the resonant circuit comprising inductor L1 and capacitor CC1 aids the initial current. Half a cycle later the current in the resonant circuit reverses and when this current exceeds that in the load resistor RL, then thyristor CSR1 cuts off and the surplus current from the resonant circuit is returned to +E through the diode DD1.

For this operation, the resonant frequency of the resonant circuit has to be slightly higher than the switching frequency of the thyristors and the characteristic impedance ($\sqrt{L1/CC1}$) is made to be of the same order as RL so that the peak current in the commutating resonant circuit is greater than the current in the load resistor RL.

This circuit, as shown in FIG. 6, suffers from a number of limitations:

a. In order that the thyristors should rapidly revert to the blocking state, a substantial maintained reverse voltage should be applied. In this circuit, the voltage is limited to of the order of 1 volt by the parallel diode. Consequently the turn-off time of the thyristors is increased and the maximum operating frequency of the inverter is limited.

b. If the load resistor RL falls below the value approximately $\sqrt{L1/CC1}$, commutation ceases with the result that both thyristors are switched on simultaneously, thereby placing a short circuit directly across the supply.

c. The inverter of this example drives a Cockcroft-Walton generator via a stepup transformer. Under no-load conditions with square wave drive the overshoot at the transformer secondary due to its leakage inductance and stray capacities will be equal to the drive voltage. Since the no-load output of the Cockcroft-Walton generator is proportional to the peak-to-peak input voltage, excessive output voltages will generate with possible disastrous consequences. It is therefore desirable that the edges of the driving waveform should be slowed up to minimize the overshoot.

It will be seen that the diodes DD1 and DD2 are connected so as to provide unidirectional overflow current paths connected respectively across the thyristors CSR1 and CSR2 to bleed off reverse current from the resonance circuit after this reverse current has cutoff the "on" thyristor. By incorporating an inductor in each of the overflow current paths, the above-mentioned limitations may be avoided or reduced.

FIG. 5 illustrates the incorporation of an inductor L2 which is shared by the overflow current paths of diodes DD1 and DD2. overshoot The operation of the circuit of FIG. 5 is as follows:

Just before thyristor CSR1 is triggered on, diode DD2 is conducting and a current Ic flows through the inductor L2 in the direction indicated by arrow Q. When thyristor CSR1 is triggered on, a current Ie flows through the thyristor into the resonant circuit comprised by inductor L1 and capacitor CC1. This current Ie into the resonant circuit is aided by the current Ic, the sum being a current Ib. The current Ic is falling in magnitude whilst the current Ie is building up resonantly. The current Ic falls to a level where the diode DD2 comes nonconducting and then the potential Vd at the output point (see the reference Vd on FIG. 5) begins to rise resonantly from −E volts to +E volts, the resonant circuit for this voltage rise being provided by inductor L2 and the stray capacity across the load resistor RL.

The waveforms of the various currents and voltages discussed above are shown in FIG. 7, the top waveform being that of the potential Va appearing at the junction between inductors L1 and L2 (see FIG. 5).

Figure 7:
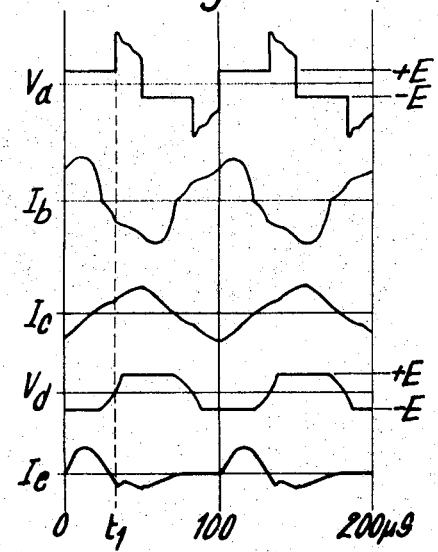
FIG. 7 shows graphs of waveforms with time of voltages and currents at various points marked in FIG. 5.

The current Ib in the resonant circuit of inductor L1 and capacitor CC1 reverses, the reversed current flowing through inductor L2. At time $t1$ (see FIG. 7), the current Ib is equal in magnitude but opposite in direction to the current Ic so that current through the thyristor CSR1 is zero and the thyristor CSR1 ceases to conduct. As a consequence, a voltage $-L2 dIb/dt$ is generated across the thyristor CSR1. The effect of this may be seen as the spike in the waveform of the potential Va (FIG. 7). This voltage spike generated by the inductor L2 rapidly removes the stored charge from thyristor CSR1 and allows it to revert to the blocking condition. Shortly after this thyristor CSR2 is fired, the operation being equivalent in the opposite direction.

Thus it will be seen that a large reverse voltage (Va) has been produced to speed up the recovery time the thyristors, and the edges of the waveform applied to the load RL have been slowed up. Further if R1 is short-circuited, the inductor L2 appears as an inductive load and the values of inductor L1, capacitor CC1 and inductor L2 can be chosen so that the circuit will continue to commutate even if load resistor RL is short-circuited.

In order to consider the effect of the inductor L2 on the overshoot at the secondary of the output transformer, where the load RL is provided by a transformer, reference is made to FIG. 8.

In FIG. 8, the transformer T is shown connected in place of resistor RL, some parts of the remaining circuitry being omitted. Inductor L3 and capacitor CC3 represent the leakage inductance and stray capacity of the transformer referred to the primary winding.

On application of a voltage step 2E volts to the transformer input, the point reference C rises resonantly to 4E volts. Just before diode DD1 conducts, the point B is at +E volts, that is the voltage across inductor L2 is zero. Hence the rate of change of current in the inductor L2 is zero and the voltages at points C and D are also at +E volts and the current at this instant is 2E.CC3/ L2+L3.

When diode DD1 conducts the effective series inductance falls to L3. Under these conditions it can be shown that the magnitude of the overshoot is 2E L3/L2+L3.

The effect of this is illustrated in FIGS. 9(a) and 9(b1. FIG. 9(a) shows the voltage waveform across the transformer when L2=0, that is with the FIG. 6 configuration. FIG. 9(b) shows the voltage waveform across the transformer when an inductor L2=8L3 is incorporated as in the FIG. 5 configuration.

FIG. 10 illustrates the modification of the inverter in which the load resistor RL' is connected across capacitor CC1' forming part of the resonant commutation circuit. A single inductor L1' with three taps performs the function of inductors L1 and L2 of FIG. 5. Thyristors CSR1' and CSR2', and the diodes DD1' and DD2' have an equivalent arrangement and function to the corresponding components in FIG. 5.

The invention is not restricted to the details of the foregoing examples.

I claim:

1. a modular unit for a high voltage generator of the Cockcroft-Walton type, comprising one or more Cockcroft-Walton stages mounted within an electrically conducting casing, which forms an encompassing screen for the said stages, and input and output terminals for connection, as desired, to another modular unit so that the voltage step-up of each unit is added, whereby a stack of N interconnected modular units can generate a voltage NV, where V is the voltage generated by each modular unit on its own.

2. A modular unit as claimed in claim 1, wherein the said screen is held at a potential intermediate that of the input and output terminals of the modular unit.

3. A modular unit as claimed in claim 2, wherein the said screen is held at a potential midway between that of the input and output terminals of the modular unit.

4. A modular unit as claimed in claim 1, wherein each of the said stages within the modular unit is stressed for predetermined potential differences between its input and output terminals and between these terminals and the encompassing screen.

5. A modular unit as claimed in claim 4, which unit together with its encompassing screen is stressed for a predetermined potential difference between it and an adjacent modular unit in a stack of modular units.

6. A modular unit as claimed in claim 5, wherein the edges of the encompassing screen are rolled over so that all outwardly facing surfaces of the screen are smoothly curved, the radius of curvature being large enough for meeting the stressing requirement between adjacent screens of adjacent modular units when mounted in a stack.

7. A modular unit as claimed in claim 1, in combination with an inverter for supplying power to the unit, which inverter comprises two thyristors and means for switching the thyristors alternately on and off, the thyristors being connected for switching current from a source, or sources, of direct current to provide an alternating current to an output load, a resonant circuit connected to receive alternating current from the thyristors, current reversal in the resonant circuit causing cutoff of that thyristor which is on before the other thyristor is switched on, two unidirectional overflow current paths connected respectively across the thyristors to bleed off reverse current from the resonant circuit after this has cut off the "on" thyristor as aforesaid, each said unidirectional bleed current path including an inductor.

8. A modular unit in combination with an inverter as claimed in claim 7, wherein the two unidirectional bleed current paths share a common inductor.